United States Patent
Hillen et al.

(10) Patent No.: US 6,697,701 B2
(45) Date of Patent: Feb. 24, 2004

(54) WELDING SYSTEM AND METHODOLOGY PROVIDING MULTIPLEXED CELL CONTROL INTERFACE

(75) Inventors: Edward Dennis Hillen, Painesville, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 146 days.

(21) Appl. No.: 09/925,198

(22) Filed: Aug. 9, 2001

(65) Prior Publication Data

US 2003/0033052 A1 Feb. 13, 2003

(51) Int. Cl.[7] .............................. G06F 19/00; G06G 7/66
(52) U.S. Cl. ....................... 700/212; 700/245; 700/264; 219/86.25; 219/110
(58) Field of Search .................................. 700/207, 212, 700/245, 264; 219/86.25, 110

(56) References Cited

U.S. PATENT DOCUMENTS

| | | | | |
|---|---|---|---|---|
| 5,574,637 A | * | 11/1996 | Obata et al. | 700/2 |
| 5,641,415 A | * | 6/1997 | Kosaka et al. | 219/86.25 |
| 6,004,019 A | | 12/1999 | Suita et al. | 364/477.06 |
| 6,278,082 B1 | * | 8/2001 | Shimogama | 219/130.5 |
| 6,444,942 B1 | * | 9/2002 | Kawai et al. | 219/110 |
| 6,486,439 B1 | * | 11/2002 | Spear et al. | 219/136 |
| 2001/0025836 A1 | * | 10/2001 | Shimogama | 219/125.1 |

* cited by examiner

*Primary Examiner*—Leo Picard
*Assistant Examiner*—Douglas S. Lee
(74) *Attorney, Agent, or Firm*—Amin & Turocy, LLP

(57) ABSTRACT

The present invention provides a welding system and methodology to facilitate communications and control. The system includes a cell controller to control one or more welders over a control network. An interface module associated with the cell controller and the control network communicates with the welders and employs a communications protocol adapted to the interface module to facilitate communications and control between the cell controller and the one or more welders over the control network.

26 Claims, 10 Drawing Sheets

WELDING SYSTEM AND METHODOLOGY PROVIDING MULTIPLEXED CELL CONTROL INTERFACE

TECHNICAL FIELD

The present invention relates generally to welding systems, and more particularly to a system and method to facilitate communications and control between one or more welding systems and an automated control cell such as a robot.

BACKGROUND OF THE INVENTION

Welding systems are often configured in an arrangement, whereby a welder is controlled by a cell or robotic control system. Several of the elements of these systems consist of sending and receiving various control signals that are operative to facilitate the welding process. As an example, analog voltage or current output signals can be employed to control various aspects of the welding process (e.g., gas, wire feed, torch travel, arc dynamics and so forth) such as adjusting various process set points and/or other parameters. Since the welding process is typically operated in a closed-loop manner, several analog signals are also received in response (e.g., closed-loop feedback) to the control output signals. As a consequence of the plurality of control signals that are supplied between the cell controller and the welding system, bulky and somewhat expensive cabling between the systems are generally required to route the various signals.

In some cases, due to the size and number of signals that are to be routed though this type of cabling, one or more controls such as push button inputs and/or other adjustments are provided as manual controls at the welding systems in order to mitigate the number of signals and associated size of the cables. Consequently, manual controls provided as part of the welding process cause operator intervention that generally slows the overall welding process and thereby increases expenses. Other cabling problems are also created since welders generally operate in substantially harsh environments (e.g., large amounts of electrical noise and/or mechanical disturbances). Thus, fairly elaborate shielding of the various control or feedback signals is typically required that impacts the size and the cost of the cable selected for control and/or communications between the systems. As can be appreciated, associated analog interface and/or control modules are provided in the welding system and cell controller to enable control and communications over cables that are coupled between the systems.

Along with the cabling issues described above, other issues are also involved when multiple welding systems are employed with the cell controller. For example, if an additional welding system were to be employed with the single cell controller described above, an additional interface module and respective cable would also have to be supplied per additional welding system to enable control between the cell controller and the welding systems. Consequently, additional component and installation costs are required to "scale" a cell controller to communicate and control additional welding systems. Furthermore, more advanced welding system configuration and control arrangements (e.g., tandem, redundant, multi-welder applications) are therefore, generally more expensive to implement. In view of cabling, scaling and manual control problems associated with conventional cell control/welding configurations, there is a need to provide a more cost efficient, automatic and scalable welding system.

SUMMARY OF THE INVENTION

The following presents a simplified summary of the invention in order to provide a basic understanding of some aspects of the present invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate control and communications between cell controllers, such as robotic control systems, and one or more welding systems. This is achieved by providing a singular communications interface within the cell controller that is operative in place of a plurality of dedicated and/or analog interface modules associated with the control of one or more welding systems. In this manner, bulky and expensive cables supplied to one or more welding systems, along with a separate interface module per cable and additional welding system can be reduced via the singular communications interface adapted to a control network and associated architecture. Thus, the singular communications interface mitigates cost, and facilitates a more robust control architecture over conventional welding systems (e.g., less cables, wires, modules to maintain). Additionally, scalability is provided since subsequent welders can be readily adapted to an existing welding control system without having to add subsequent interface modules in the cell controller. Other features include utilizing digital command and feedback signals over the control network thereby mitigating the need to provide manual control adjustments to one or more welders.

In accordance with the present invention, a communications interface is provided between a cell controller and one or more welding systems, wherein a plurality of various communications protocols can be utilized to facilitate communications and control. For example, this can include sending and receiving control information such as command output signals, synchronization commands, feedback signals and status between a cell or robot controller and one or more welders (e.g., set point, trigger, trim, weld controller feedback). By employing the communications interface and protocol of the present invention, such applications as tandem welding systems, fault detection and/or maintenance, file transfer between welding systems and/or cell controllers, redundant welding systems, and multi-cell coordination and control are greatly facilitated.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate welding control and communications between one or more welding systems and a cell or robot controller. A communications interface is provided that can utilize a plurality of protocols between the cell controller and the welding systems. For example, a protocol such as Device Net or ProfiBus can be employed to transfer digitized control information to the welding systems and to receive a digitized information response from these systems in the form of feedback and/or other communications. The present invention enables scaling of a current welding system (e.g., adding more welders to present system) without requiring additional interface modules within the cell controller. This can be achieved by employing welding system node addressing within the selected protocol to communicate with one or more welders suitably adapted for such communications. The selected communications protocol and associated interface module facilitates a plurality of welding applications. These applications can include error detection, maintenance, file transfers between the welders and/or cell controllers, redundant applications, wherein a standby welder is enabled if a failure occurs in a primary or active welder, tandem welding applications, wherein two or more welders are coordinated and/or synchronized to provide joint control of a process, and multi-cell communications between cell controllers and welders of different systems to exchange information and provide higher levels of control.

Figure 1:
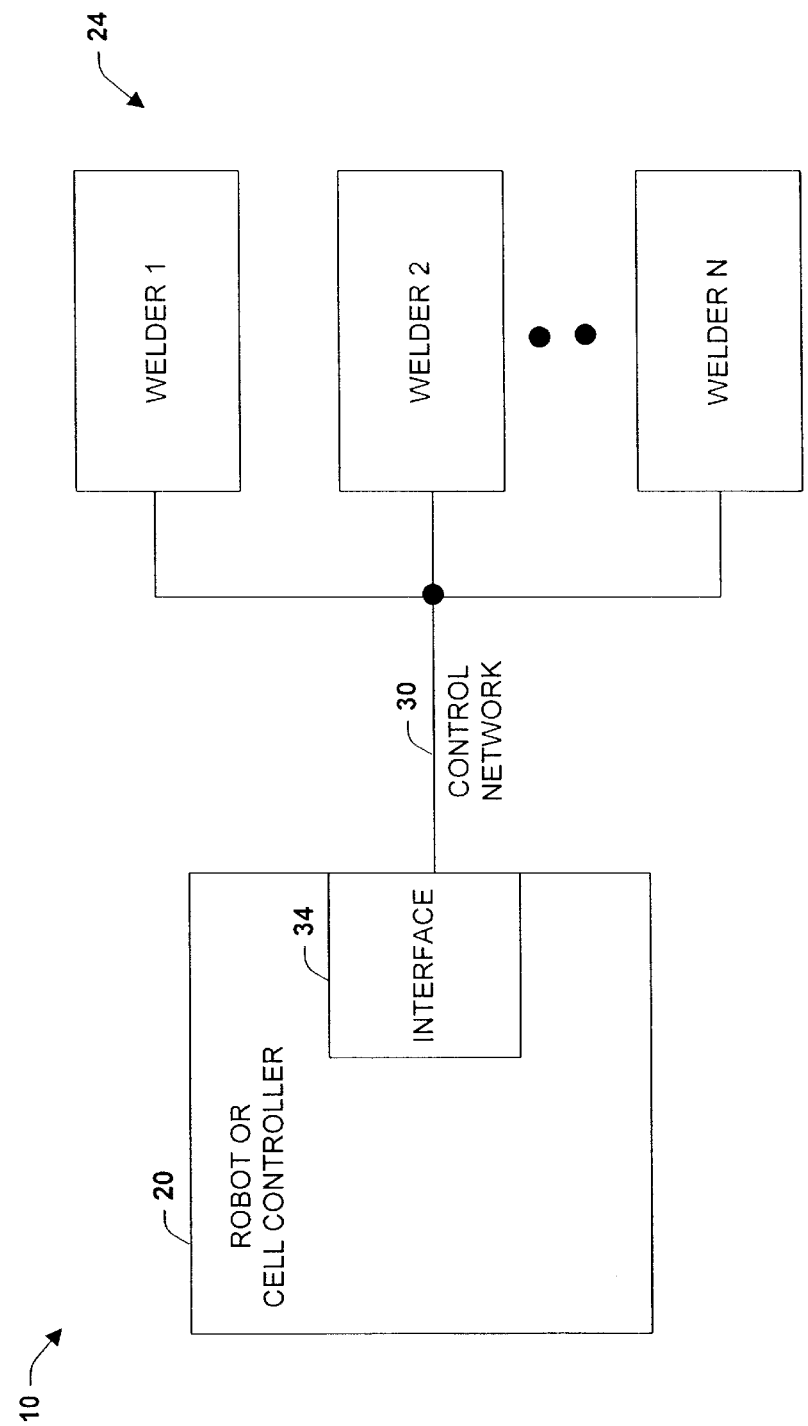
FIG. 1 is a schematic block diagram illustrating a cell controller and welding systems interface in accordance with an aspect of the present invention.

Referring initially to FIG. 1, a welding system 10 illustrates communications and control by a cell controller 20 to one or more welders 1 through N 24 (N being an integer). The cell controller 20, which can include robotics control elements such as associated control processors and/or related control software, is operatively coupled to the welders 24 via a control network 30, wherein control, feedback, file, diagnostic, and other information can be exchanged to facilitate a plurality of welding applications. As will be described in more detail below, the control network 30 can include network and/or wireless communications, wherein a communications protocol is utilized to send or receive information to and from the welders 24.

In accordance with the present invention, an interface module 34 is provided with the cell controller 20 to enable control and information exchange with the welders 24. The interface module 34, which can be adapted to provide network capabilities, sends an address and associated data to the welders 24 to facilitate control of the welders. For example, the welder$_1$ can be addressed as node address 1, whereas the welder$_2$ can be addressed as node address 2. As can be appreciated, a plurality of other addresses can be similarly employed. Along with the associated addressing information, control data such as set point output values and digital output states can be directed over the control network 30 from the cell controller 20 to the welders 24. Control information such as welder feedback and digital input values can be similarly directed from the welders 24 to the cell controller 20 to provide closed-loop or other type of control. As will be described below, other information such as diagnostic and file information can also be communicated.

By adapting the interface module 34 to communicate over the control network 30, the present invention provides several advantages over conventional systems. As an example, the interface module 34 enables other welders to be added to the welding system 10 by configuring additional welding system addresses within the subsequently added welding system (e.g., dip switch, software setting) and configuring the interface module 34 to communicate with the newly added addresses (e.g., via control software and/or hardware settings). In this manner, the system 10 can be readily scaled for additional welding capabilities without having to add an additional interface module within the cell controller 20. This also mitigates having to add expensive cabling per the additional module since the welders 24 can be added to the system via relatively inexpensive communications "taps." In addition, digital control over the network 30 facilitates configuration and coordination between the welders 24, wherein synchronization commands such as—"stop" and "start" or adjustment commands can be initiated from the interface module 34 to mitigate having an operator provide manual inputs to the welders 24 during the welding process. It is noted that the welders 24 can be adapted with analog to digital (A/D) and/or digital to analog (D/A) capabilities along with network communications capability in order to facilitate control of the welders in accordance with the present invention.

Figure 2:
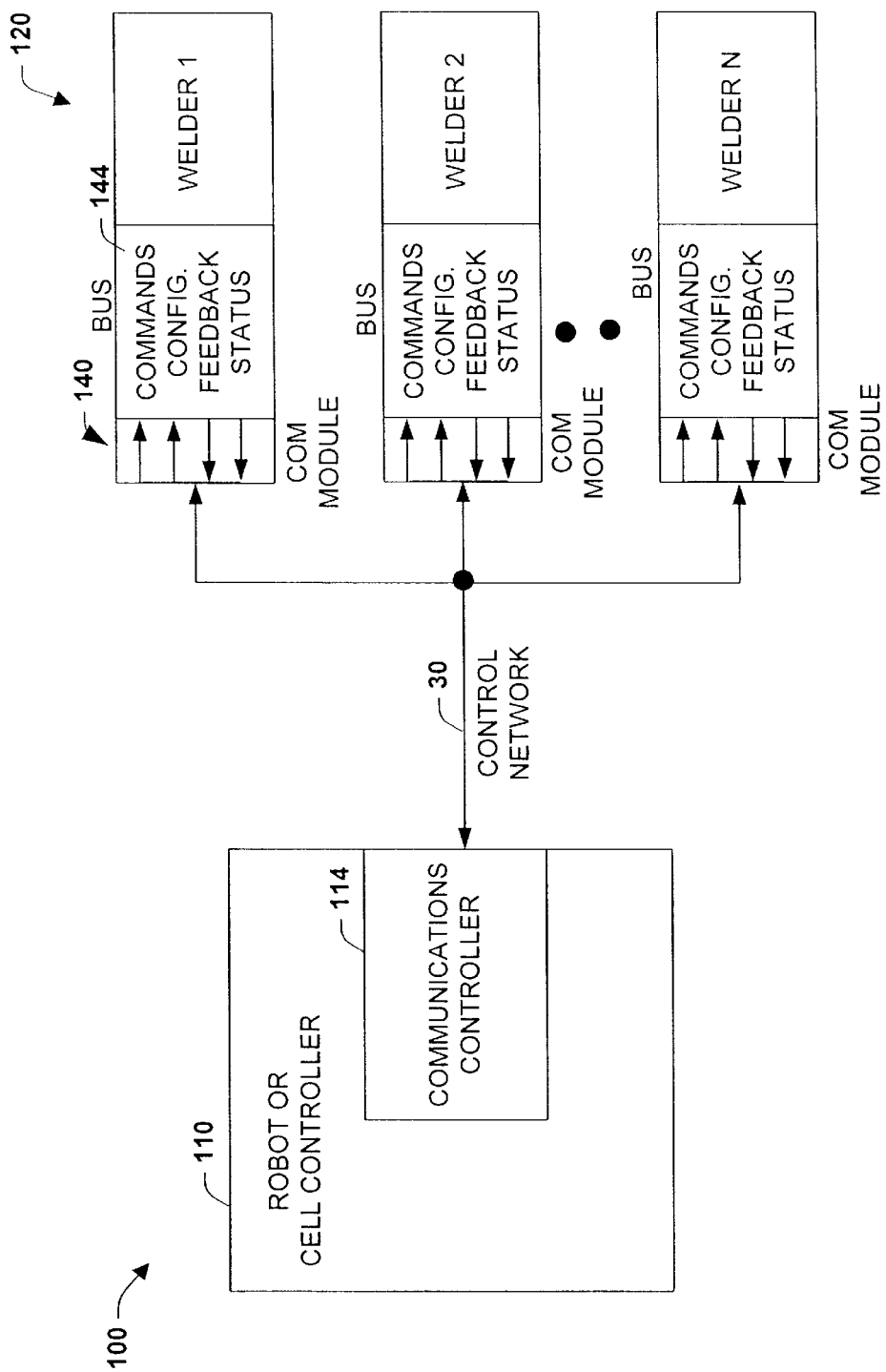
FIG. 2 is a schematic block diagram illustrating a communications controller and control bus interface in accordance with an aspect of the present invention.

Referring now to FIG. 2, a welding system architecture 100 is illustrated in accordance with the present invention. The system 100 includes a cell controller 110 having an associated communications controller 114 adapted to communicate over the control network 30. The communications controller 114 can be any commercially available controller to provide control and information exchange with one or more welders 1 through N 120, N being an integer. For example, the communications controller 114 can provide a Device Net interface, which is well understood for communicating to the control network 30 and the welders 120. Other communications controllers can include a Control Net interface, a Profibus interface, an Ethernet interface utilizing User Datagram Protocol (UDP) and/or Transmission Control Protocol (TCP), and/or an ArcLink interface, for example. It is to be appreciated that substantially any parallel, serial and/or wireless interface module may be employed that is capable of providing control and information exchange in a substantially robust manner (e.g., error checking protocols, noise immunity characteristics for factory environments).

The communications controller 114 communicates digital control and other information to the welders over the control network 30 via a communications module adapted to the welder and the desired network protocol. For example, the welder 120 includes a communications module 140 that is configured according to the communications protocol generated by the communications controller 1114. The communications module 140 is operatively coupled to a welding system bus 144 that exchanges digital input and output information with the welder 120. The welding system bus 144 can exchange information with a data store (not shown) that includes welding system information such as diagnostics and/or control profiles for the welders. An example of information exchanged over the control network 30 to the welding system bus 144 can include control output information such as set points, trigger signals (e.g., start/stop) trim settings, gas control settings, and wire control settings. Other information can include configuration settings for the welders 120. Information received from the control network 30 and associated welders 120 can include digitized arc voltage or current information, feedback responses, AWFS and AIC detected signals, and fault or status information. It is top be appreciated that other control information can be similarly communicated. As described above, the digitized information and associated addressing of the present invention, is employed to control the one or more welders 120 without having to add additional analog interface modules and associated cabling within the cell controller 110. As illustrated in FIG. 2, each of the respective welders 120 can be adapted to include associated communications modules and welding system buses.

Figure 3:
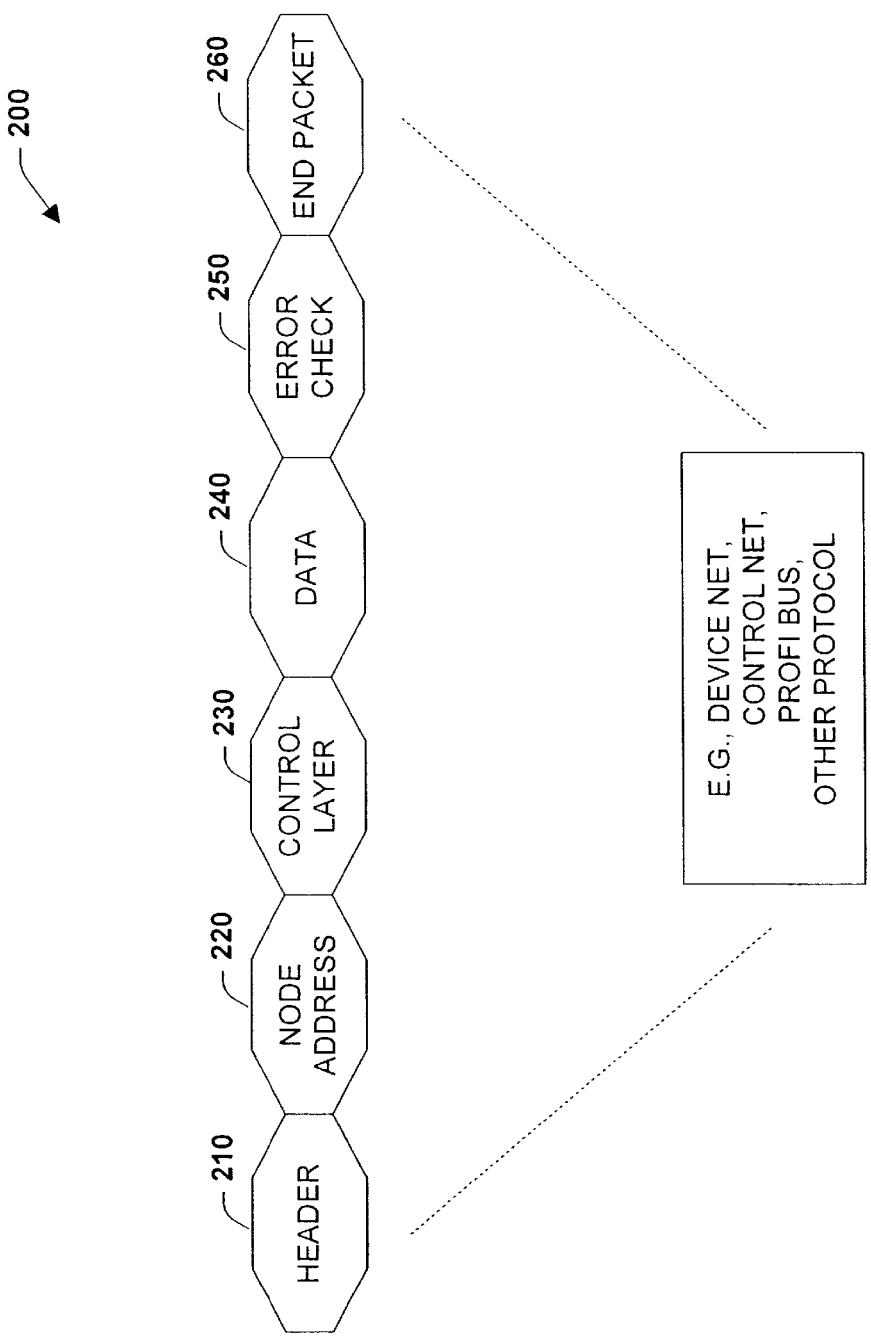
FIG. 3 is a diagram illustrating an exemplary communications protocol in accordance with an aspect of the present invention.

Turning now to FIG. 3, an exemplary communications protocol 200 is illustrated in accordance with the present invention. The protocol 200 can include a header field 210 to identify new communications packets, a node address field 220 to communicate with selected welders, a control layer 230 to provide synchronization and/or command information, a data layer 240 to exchange system information with the welder, an error check layer 250 to facilitate communications and mitigate errors in communications (e.g., CRC, check sum) and an end packet 260 to signify an end to a communications segment to the welder or network of welders. As noted above, the protocol can include such commercially available standards such as Device Net, Control Net and ProfiBus, however, other protocols can also be similarly provided that include substantially robust performance and substantially fast communications rates to support the control loops operated in accordance with the one or more welders.

Figure 4:
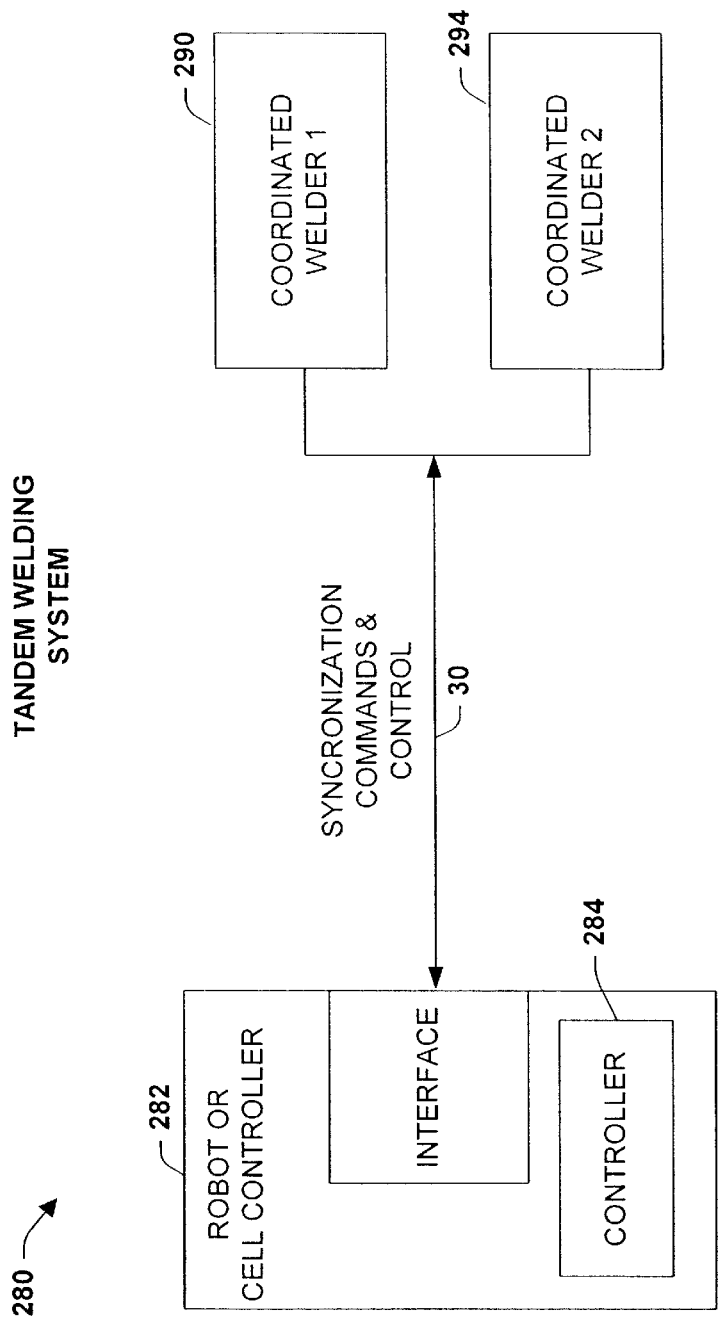
FIG. 4 is a schematic block diagram illustrating a tandem welding system in accordance with an aspect of the present invention.

Referring now to FIG. 4, a tandem welding system 280 is illustrated in accordance with the present invention. The tandem welding system 280 can include a cell controller 282 having a controller 284 adapted to control a coordinated welder 290 and a second coordinated welder 294. Tandem applications can include independent control of a lead and a trail wire (not shown) of a tandem process to enable procedure optimization such as bead wetting, bead profile, and penetration. In the tandem application, the controller 284 can include hardware and software capable of controlling one or more coordinated actions between the welders 290 and 294. For example, this can include concurrent welding operations such that the welders 290 and 294 are started and stopped in a coordinated or synchronous manner to facilitate an overall welding process.

As an example of this process, synchronous commands can be issued over the network 30 by the controller 284 such that the welders 290 and 294 perform all and/or portions of a coordinated welding process. This can include one welder performing a portion of the process with the other welder performing other portions of the process. Other actions can include controlling both welders such that similar portions of a work piece, for example, are concurrently welded at similar locations, concurrently welded at dissimilar locations, and/or other combinations including staged or staggered welding. One possible technique to perform coordinated welding is to supply the welders 290 and 294 with a universal clock reference (not shown) (e.g., externally supplied and/or derived from a clock supplied on the network 30) such that as the welders 290 and 294 are given control commands, the welders perform these commands at a predetermined time or count offset from the universal clock. Thus, operations and commands can then be coordinated with the clock in a substantially synchronous manner. Other types of commands can include adjustable time delay commands for starting and stopping a trail and/or lead arc, time commands and settings for a crater fill of trail and lead arcs, feedback detection status for arc detection and collision sense, safety stop commands for termination of a weld cycle, trigger commands for on/off timing (e.g., on at same time or phase shift), sending suitable output command levels per respective welder to achieve desired weld profile, applying suitable procedures per respective welder to achieve desired weld profile (e.g., a first welder pulsed, a second welder continuous voltage applied).

Figure 5:
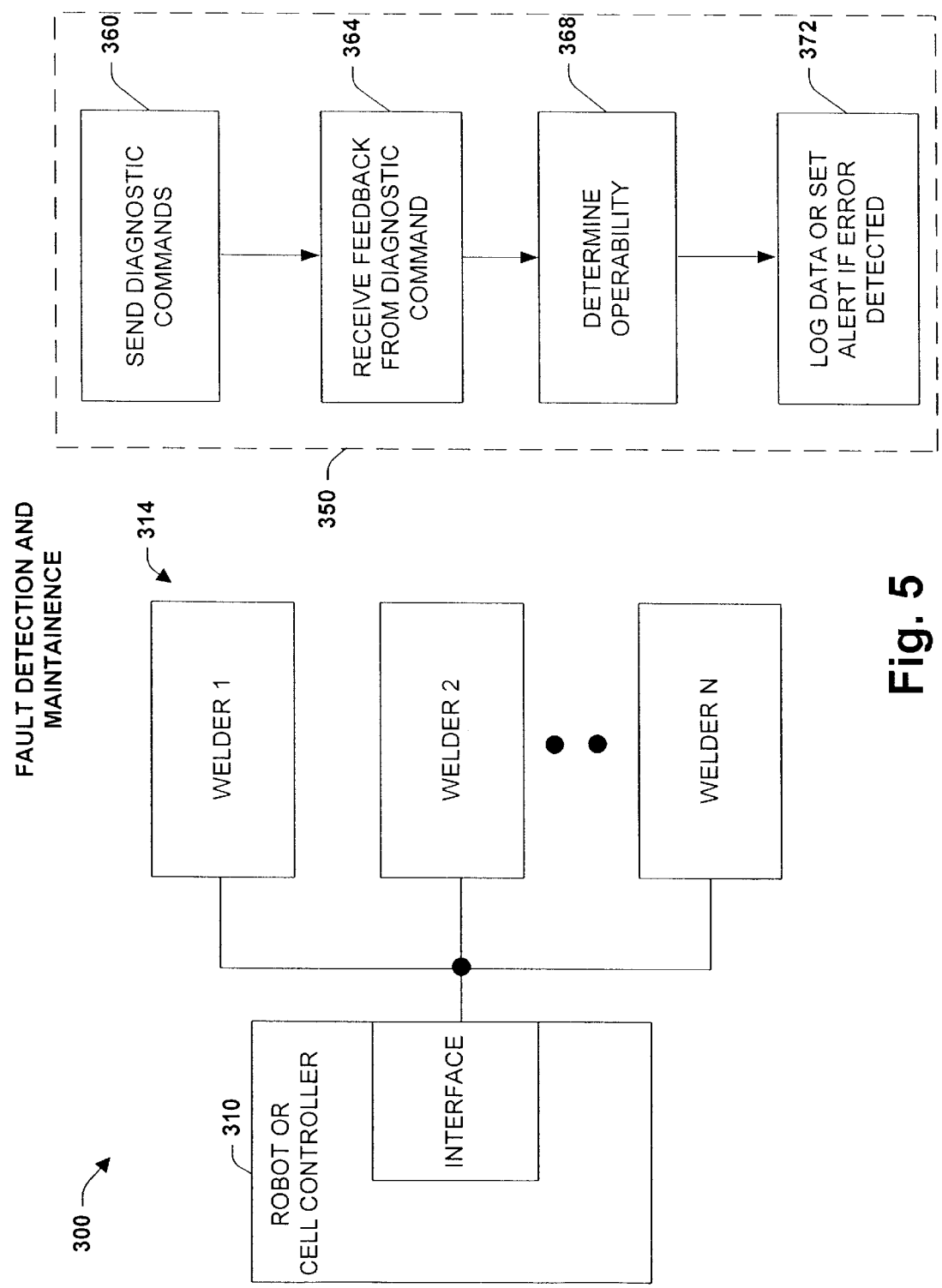
FIG. 5 is a schematic block diagram and a fault detection and maintenance in accordance with an aspect of the present invention.

Referring now to FIG. 5, a fault detection and maintenance system 300 and associated methodology 350 is illustrated in accordance with the present invention. The system 300 includes a cell controller 310 and associated welders 1 through N similarly configured as described above. The methodology 350 describes a process, wherein the health or operational characteristics of the system 300 can be determined. While, for purposes of simplicity of explanation, the methodology 350 is shown and described as a series of acts, it is to be understood and appreciated that the present invention is not limited by the number or order of acts, as some acts may, in accordance with the present invention, occur in different orders and/or concurrently with other acts from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Proceeding to 360, diagnostic commands are directed to the welders 314. This can include queries for specific information and/or can include information requests that are received in a file, for example, that include multiple codes reflecting the state of the welders 314. At 364, the cell controller 310 or other entity receives diagnostic feedback in response to the commands issued at 360. If no information is received as feedback, an error flag or other alert can be set and or communicated. At 368, received diagnostic feedback is analyzed to determine the health of the welders 314. For example, tables can be employed reflecting the state of certain variables at expected points in time. If the diagnostic feedback does not agree with the predetermined state information, an error flag or other alert can be issued. At 372, the cell controller can log any errors that are detected, if minor in nature, (e.g., occasional check sum errors) or can set an alert or contact an operator if substantial welding process degradation is detected.

Figure 6:
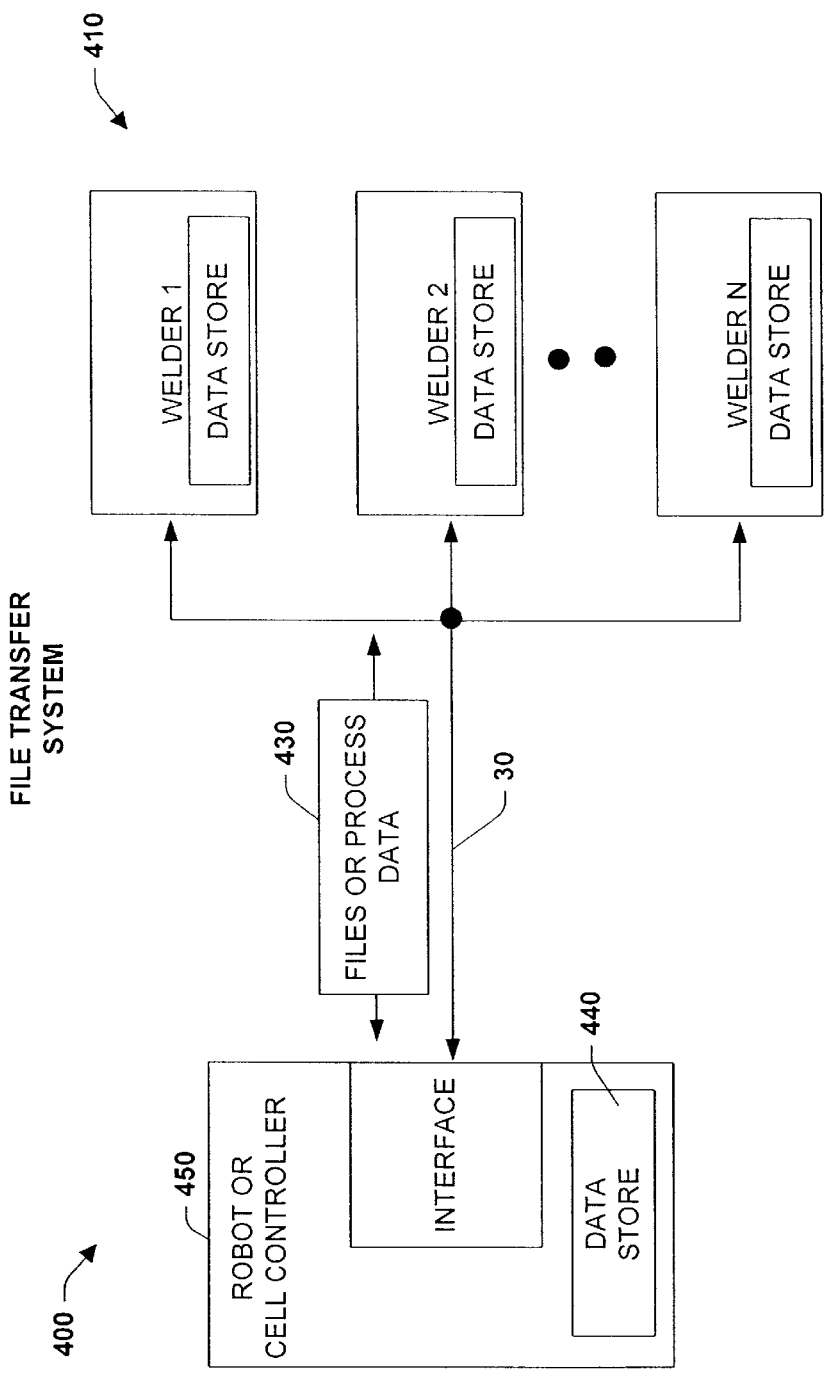
FIG. 6 is a schematic block diagram illustrating a file and data transfer system in accordance with an aspect of the present invention.

Referring briefly to FIG. 6, a file transfer system 400 is illustrated in accordance with the present invention. Welders 1 through N 410 are illustrated having an associated data store, respectively. The data stores can include a plurality of information relating to the control, operation, maintenance, and function of the welders 410. For example, this information can include variable settings observed at different points in the welders operating cycle, process information, configuration information such as control programs and set up files along with quality or other information. As illustrated, the information in the data stores can be transferred over the control network 30 as one or more files and/or process data 430 and received in a data store 440 in a cell controller 450. It is noted that the files 430 can also be directed from the data store 440 to the welders 410 as determined by the cell controller 450. This can include intra-welder file transfer operations, wherein a file is read from one welder and transferred to another welder via the cell controller 450.

Figure 7:
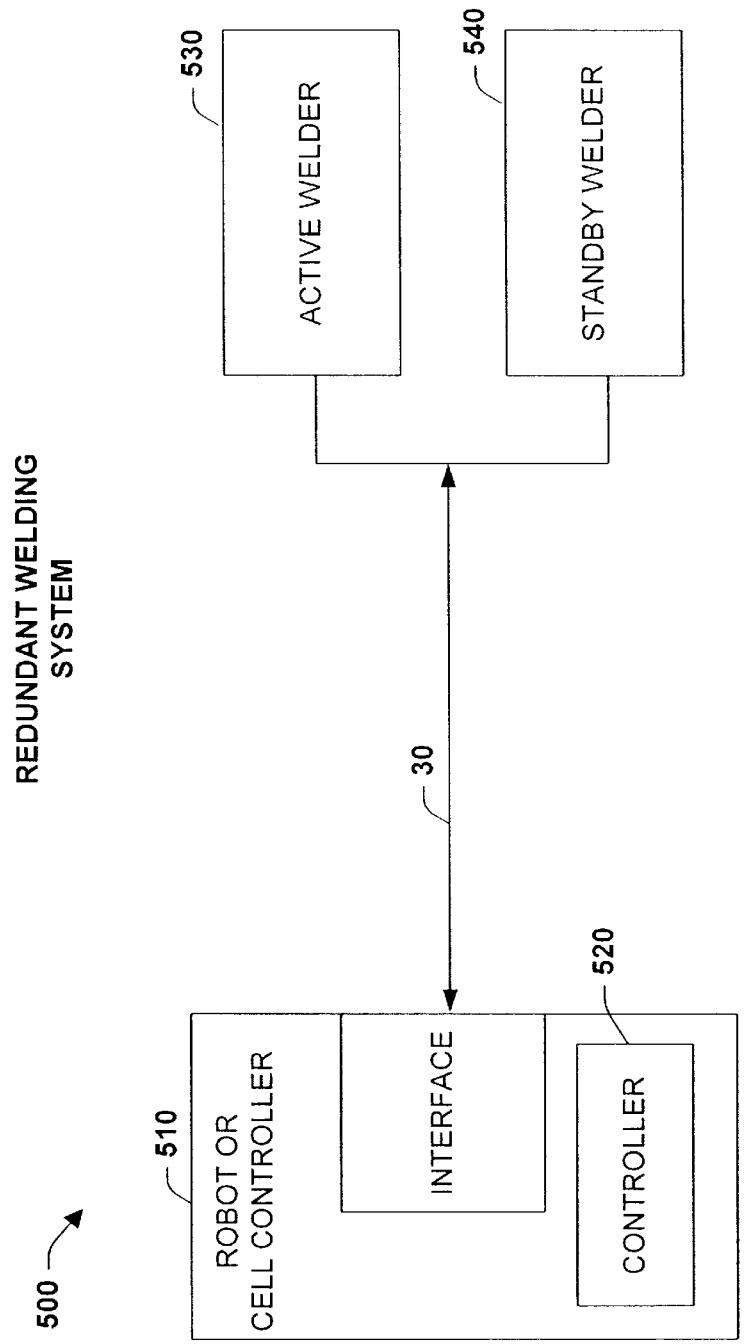
FIG. 7 is a schematic block diagram illustrating a redundant welding system in accordance with an aspect of the present invention.

Turning to FIG. 7, a redundant welding system 500 is illustrated in accordance with the present invention. The redundant welding system 500 can include a cell controller 510 having a controller 520 adapted to control an active welder 530 and standby welder 540. The controller 520 can include diagnostic and/or interpretive hardware and software capable of determining the operating characteristics of the active welder 530. This can include performing substantially real-time diagnostics on the active welder 530 to determine that welding processes are proceeding/continuing as desired. If a fault or error is detected in the active welder 530, the controller 520 can send "switchover" commands to the standby welder 540 in order to direct the standby welder 540 to become the active welder in the process. Although not shown, causing a switchover from the active system to the standby system can include switching electronics that disconnects or disassociates the active system from the control network 30 or other portions of the welding process. This can also include activating portions of the standby system 540 to the current portion of the welding process.

Figure 8:
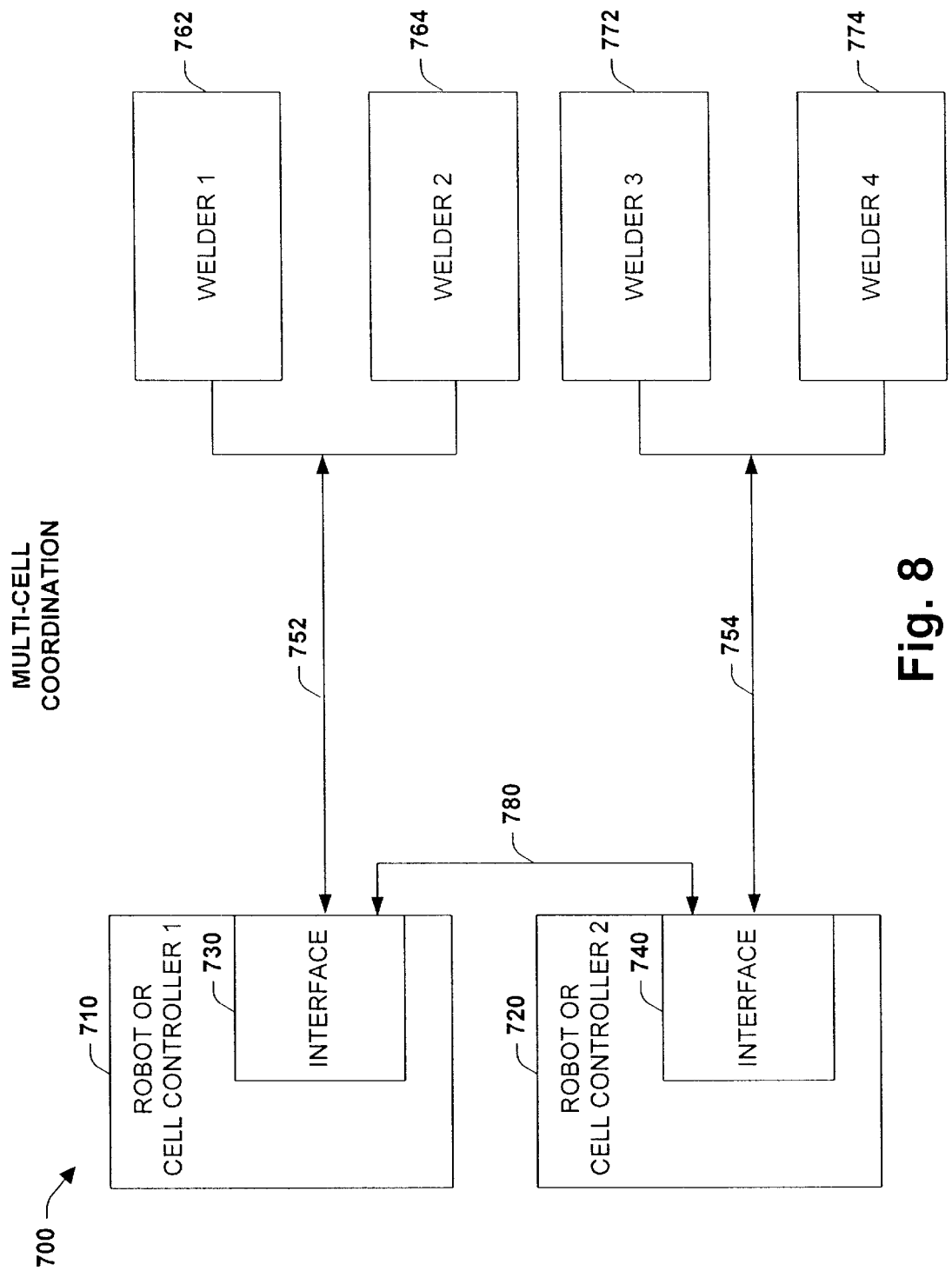
FIG. 8 is a schematic block diagram illustrating multi-cell coordination in accordance with an aspect of the present invention.

Referring to FIG. 8, a system 700 illustrates multi-cell coordination and/or communication in accordance with an aspect of the present invention. The system 700 includes one or more cell controllers 710 and 720 with associated interface modules 730 and 740. Each of the cell controllers provides a private network 752 and 754 for controlling welders 762/764 and 772/774, respectively. An additional network channel 780 can also be configured in the system 700 such that the interface modules 730 and 740 can provide intra-cell communications. The network channel 780 can employ substantially any network or control protocol and can support a plurality of features. For example, higher level manufacturing operations can be coordinated between the cell controllers 710 and 720. Other features can include transferring information from the welder 762 and/or 764 in network 752 to the welders 772 and/or 774 in network 774 or vice versa. This can enable such features as diagnostic checking between cells and/or transferring such information to higher order computers and/or remote networks.

Figure 9:
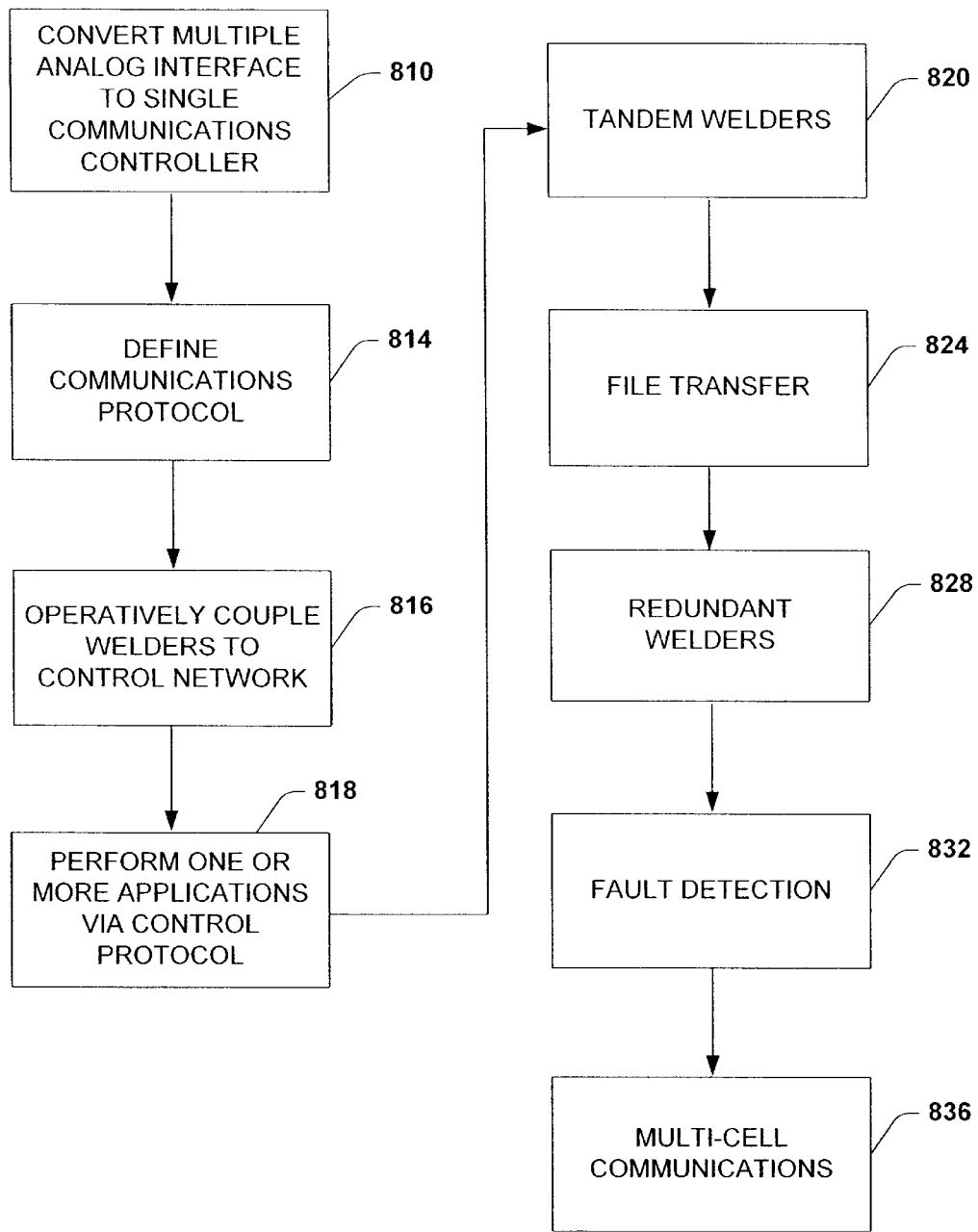
FIG. 9 is a flow diagram illustrating a methodology providing cell control and communications to welding systems in accordance with an aspect of the present invention.

FIG. 9 described below, illustrates a methodology for providing various aspects of welding communications and control in accordance with the present invention. While, for purposes of simplicity of explanation, the methodology is shown and described as a series of acts, it is to be understood and appreciated that the present invention is not limited by the number or order of acts, as some acts may, in accordance with the present invention, occur in different orders and/or concurrently with other acts from that shown and described herein.

Referring to FIG. 9, and proceeding to 810, multiple analog interfaces related to a cell controller are converted to singular communications controller capable of addressing, controlling and interfacing to a plurality of welding systems. At 814, a communications protocol is defined to provide interface capabilities and understanding between the welding systems and the cell controller. At 816, the plurality of welders described at 810 are operatively coupled to a control network. At 818, one or more welding applications are performed via the control protocol and communications controller of 810 and 820. As an example of these applications, tandem welders can be configured and controlled at 820, file transfer operations can be performed at 824, redundant welders can be controlled at 828, fault detection and maintenance can be performed at 820, and multi-cell communications can be performed at 836.

Figure 10:
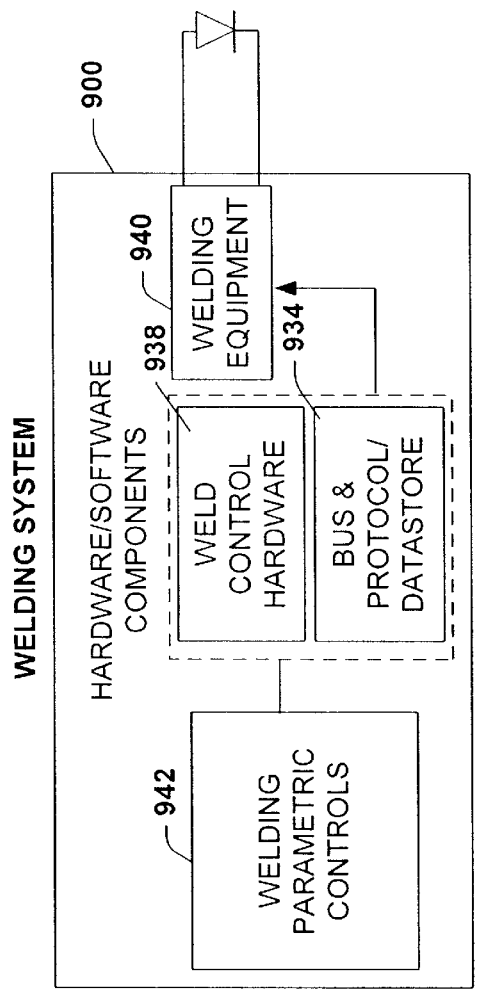
FIG. 10 is a schematic block diagram illustrating an exemplary welding system in accordance with an aspect of the present invention.

Referring to FIG. 10, an exemplary welding system 900 is illustrated in accordance with an aspect of the present invention. The welding system 900 communicates with the cell controllers previously described and can include a local bus and associated data store 934 communicating with weld control hardware 938 that controls associated welding equipment 940, wherein the welding equipment 940 is the physical hardware producing the weld such as a wire feeder, contact tip and associated conditioner, gas mixer, anti-spatter injection system, gas controller, clamp actuator, travel carriage/part manipulator, robot arm/beam/torch manipulator, seam tracker, other input/output devices and welding power source (not shown). The weld control hardware 938 may include a weld controller (not shown), an arc/weld monitor (not shown), and weld I/O and communications interface (not shown) to control the welding equipment 940.

In accordance with the present invention, the welding system 900 includes control hardware and/or software to provide one or more welding parametric controls 942. This can include aspects such as controlling weld part angles, wherein parts can be welded in a substantially horizontal position and/or rotated/positioned (e.g., robotic translation) to provide welds in a downward/non-horizontal angle, for example. Other parametric controls 942 include controlling parameters such as wire feed speed, wire travel speed, arc voltage, torch angle, contact tip to work distance and welding gas controls, for example.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding system, comprising:
    a cell controller to control two or more welders over a control network, thereby facilitating separate control of the two or more welders;
    a singular communication interface module associated with the cell controller and the control network to communicate with the one or more welders; and
    a communications protocol adapted to the interface module to facilitate communications and control between the cell controller and the two or more welders Over the control network.

2. The system of claim 1, the interface module and communications protocol configured according to at least one of Device Net, Control Net, ProfiBus, User Datagram Protocol (UDP), Transmission Control Protocol (TCP), and ArcLink.

3. The system of claim 1, the interface module communicates at least one of: command, configuration, set point, status and feedback information between the cell controller and the one or more welders.

4. The system of claim 1, the communications protocol includes at least one of: a header, a node address, a control layer, a data layer, an error check layer, and an end packet.

5. The system of claim 1, father comprising fault detection and maintenance routines to diagnose problems within the welding system.

6. The system of claim 1, the interface module configured to transfer data between data stores associated with the one or more welding systems and a data store on the cell controller.

7. The system of claim 6, the interface module configured to transfer data between the one or more welders.

8. The system of violin 1, the one or more welders configured in a redundant configuration having an active welder and a standby welder.

9. The system of claim 8, further comprising a controller to control switching between the active welder and the standby welder.

10. The system of claim 1, the one or more welders configured in a tandem configuration having coordinated welders.

11. The system of claim 10, further comprising a controller and associated commands to synchronize the coordinated welders over the control network, the commands including at least one of: adjustable time delay commands for starting and stopping a frail or lead arc, time commands and settings for a crater fill of the trail and lead arcs, feedback detection status for arc detection and collision sense, safety stop commands for termination of a weld cycle, trigger commands for on or off timing, sending suitable output command levels per respective welder to achieve a desired weld profile, applying suitable procedures per respective welder to achieve a desired weld profile.

12. The system of claim 11, further comprising a universal clock to enable the synchronization.

13. The system of claim 1, further comprising at least one other cell controller having an associated interface module to provide multi-cell communications and coordination.

14. The system of claim 13, the at least one other cell controller enabling transfer of control and data between the one or more welders and one or mare other welders.

15. A welding communications method, comprising:
communicating and controlling two or more welders over a control network, thereby facilitating separate control of two or more welders;
adapting a singular interface to the control network to communicate and control the one or more welders; mid providing a protocol with the interface to facilitate communications and control of the two or more welders over the control network.

16. The method of claim 15, further comprising communicating at least one of: command, configuration, set point, status and feedback information to the one or more welders.

17. The method of claim 15, further comprising providing a multi-layered protocol to facilitate communications and control.

18. The method of claim 15, further comprising providing fault detection to diagnose problems within the welding system.

19. The method of claim 15, further comprising transferring information between the one or more welders to coordinate a welding process.

20. The method of claim 15, further comprising adapting the one or more welders in a redundant configuration.

21. The system of claim 15, further comprising adapting the one or more welders in a tandem configuration utilizing coordinated welders.

22. The method of claim 21, further comprising synchronizing the coordinated welders.

23. The method of claim 15, further comprising utilizing multiple communications channels to enable multi-veil communications and coordination.

24. A welding system, comprising:
means for communicating to two or more welders over a control network, thereby facilitating separate control of the two or more welders;
means for interfacing to the control network to communicate with the one or more welders; and
means for adapting a protocol to facilitate communications with the one or more welders over the control network.

25. A tandem welding system, comprising:
a cell controller to control coordinated welders over a control network;
a singular communications interface module associated with the cell controller and the control network to communicate with the coordinated welders; and
a command protocol adapted to the interface module to facilitate communications and control between the cell controller and the coordinated welders over the control network.

26. The system of claim 25, the command protocol further comprising commends to synchronize the coordinated welders over the control network, the commands including at least one of: adjustable time delay commands for starting and stopping a trail or lead arc, time commands and settings for a crater fill of the trail and lead arcs, feedback detection status for arc detection and collision sense, safety stop commands for termination of a weld cycle, trigger commands for on or off timing, and commands to achieve a desired weld profile.

* * * * *

UNITED STATES PATENT AND TRADEMARK OFFICE
CERTIFICATE OF CORRECTION

PATENT NO.   : 6,697,701 B2
DATED        : March 10, 2004
INVENTOR(S)  : Edward D. Hillen et al.

It is certified that error appears in the above-identified patent and that said Letters Patent is hereby corrected as shown below:

Column 5,
Line 3, "1114" should be -- 114 --

Column 8,
Line 10, "Over" should be -- over --

Column 9,
Line 1, "father" should be -- further --
Line 1, "violin" should be -- claim --
Line 3, "mare" should be -- more --
Line 5, "frail" should be -- trail --
Line 6, "mid" should be -- and --.

Column 10,
Line 1, "claim 15," should be -- claim 16, --
Line 2, "veil" should be -- cell --
Line 10, "commends" should be -- commands --

Signed and Sealed this

Twenty-second Day of June, 2004

JON W. DUDAS
*Acting Director of the United States Patent and Trademark Office*